June 26, 1962 H. E. STEHMAN ET AL 3,041,084
COMBINATION OUTBOARD MOTOR GUARD, DOLLY AND BOAT SEAT
Filed Aug. 21, 1959 2 Sheets-Sheet 1

Harold E. Stehman
Joseph P. Wall
INVENTORS

BY *Clarence A.O'Brien*
*and Harvey B. Jacobson*
Attorneys

June 26, 1962 H. E. STEHMAN ET AL 3,041,084
COMBINATION OUTBOARD MOTOR GUARD, DOLLY AND BOAT SEAT
Filed Aug. 21, 1959 2 Sheets-Sheet 2
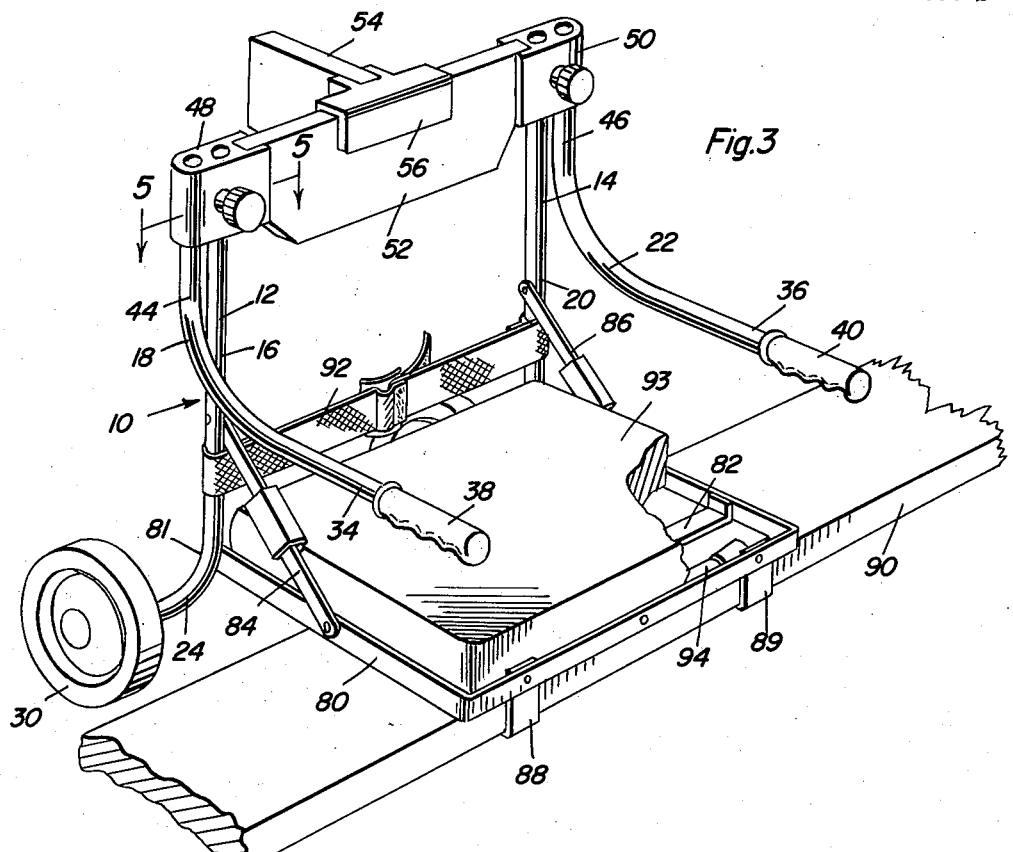
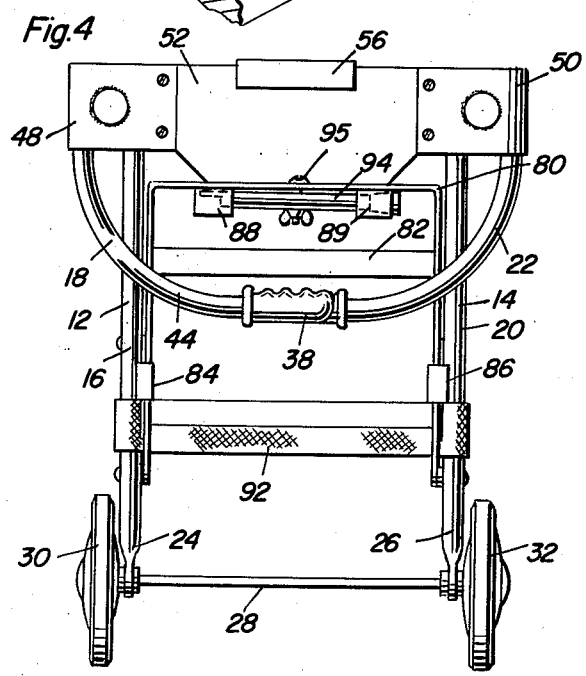
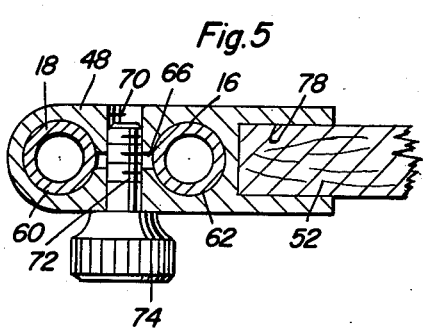
Harold E. Stehman
Joseph P. Wall
INVENTORS
BY Clarence A. O'Brien
and Harvey B. Jacobson
Attorneys

United States Patent Office 3,041,084
Patented June 26, 1962

3,041,084
COMBINATION OUTBOARD MOTOR GUARD, DOLLY AND BOAT SEAT
Harold E. Stehman, 8508 W. Meinecke Ave., and Joseph P. Wall, 2155 N. 83rd St., both of Wauwatosa 13, Wis.
Filed Aug. 21, 1959, Ser. No. 835,331
7 Claims. (Cl. 280—47.24)

This invention relates to a combined device to serve multiple purposes, each of which fulfills a need in connection with boating.

The device is capable of performing a number of functions, all of a continuing nature so that the device is put to constant use. Boat seats, life preservers and engine stands have been commercially available for a long time. An object of this invention is to provide a device making available such items as boat seats, life preservers and engine stands in a combination which is practical. Practicability is emphasized in that it is understood that previous combination devices have been conceived, but with moderate practicability.

As an example of a typical embodiment of the invention, a device is provided which produces a compact protective guard frame and secure base upon which an engine may be mounted during transportation in a motor vehicle to prevent damage to the outboard motor which sometimes occurs due to rolling or tipping. When arriving at the site where the engine is to be used or stored, the engine carrier assembly is removed from the motor vehicle and used either as a work, storage or portable carrier to get the engine, tackle box, gasoline, etc. to the boat. When at the boat, the engine is removed from the device and installed in the boat and the device is then installed on the boat seat by means of hooks on the seat assembly to serve as a comfortable seat and backrest and to further the peace of mind that a good life preserver is available in that the seat is a life preserver.

The above sequence illustrates the concept that the device serves a continuing variety of uses, all of great interest to anyone using or transporting an outboard engine.

Accordingly, a further object of the invention is to provide a unique outboard motor transporting device which is constructed and arranged to be converted from a motor transporting position to a motor storage position, at which position the outboard motor is protected and/or converted to a seat.

One of the important features of the invention is in the construction enabling the outboard motor to be protected while it is in transportation or storage. A further important feature is the side of configuration made such that a simple adjustment furnishes armrests when the device is converted to a seat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a perspective view showing the device adjusted to engage the seat of a boat and form a more comfortable seat.

FIGURE 4 is a front elevational view of the device showing the handles in another adjusted position.

FIGURE 5 is an enlarged sectional view taken on the line 5—5 of FIGURE 3.

Figure 1:
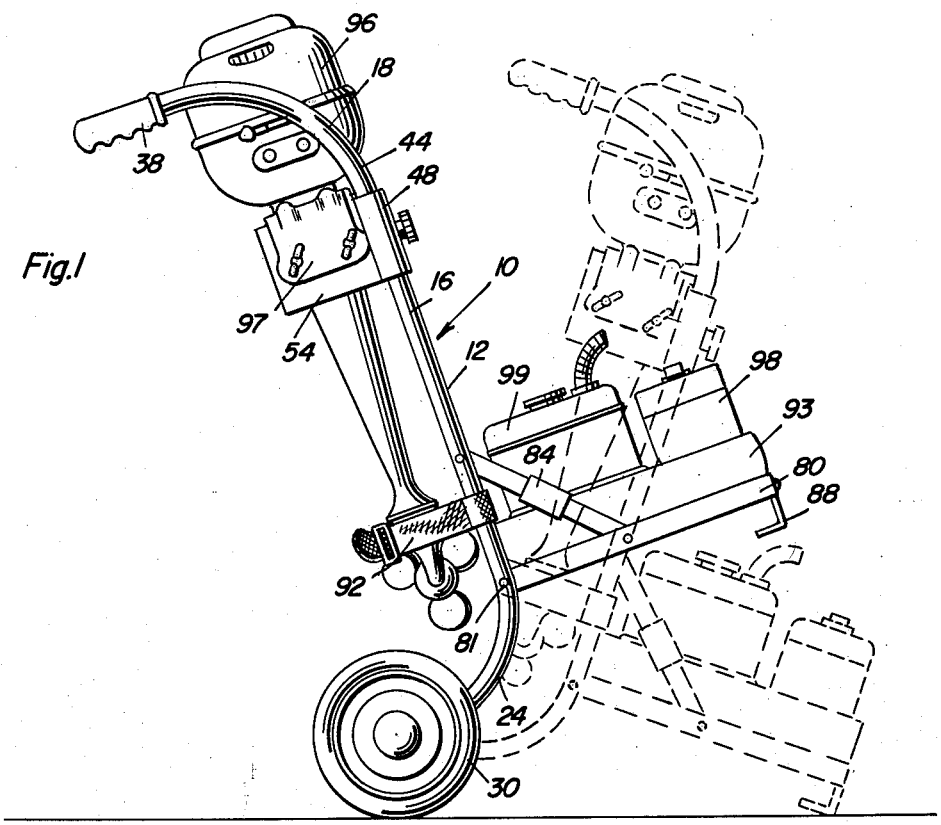
FIGURE 1 is a side elevational view of the device in the outboard motor transporting position, and a side elevational view of the device shown in dotted lines representing the outboard motor stand supporting position.

In the accompanying drawings a combination 10 is shown in several different positions. Structurally, the device is made quite simple, this being considered a necessity to practicability. There are two sides 12 and 14. Side 12 is made of two tubing sections 16 and 18 while side 14 is made of tubing sections 20 and 22. Sections 16 and 20 have a substantial straight portion, together with arcuate lower ends 24 and 26 through which axle 28 extends. The axle supports wheels 30 and 32. Side sections 18 and 22 have straight outer end parts 34 and 36 with handgrips 38 and 40 thereon. The opposite ends are smoothly curved as at 44 and 46.

The sections of the sides are connected together by means of identical clamps 48 and 50. A backrest board 52 extends across and is secured to both of the clamps and is equipped with an outboard motor support block 54 held in place by means of a bracket 56. Typical clamp 48 (FIGURE 5) has two passages 60 and 62 extending completely therethrough and forming pockets within which to accept and hold sections 16 and 18 of side 12. There is a slot 66 between passages 60 and 62 in order to provide a resilience in the body of clamp 48. Half threaded bore 70 extends through the body of clamp 48 and crosses slot 66. It has a screw 72 therein with a thumb grip 74 at one end. Upon tightening the screw 72 the side sections 16 and 18 are frictionally gripped and held. Backrest 52 is preferably inset within a pocket 78 in one side of the body of clamp 48 and is held in place by frictional grip, bolting, riveting, or other standard fastening means.

Figure 2:
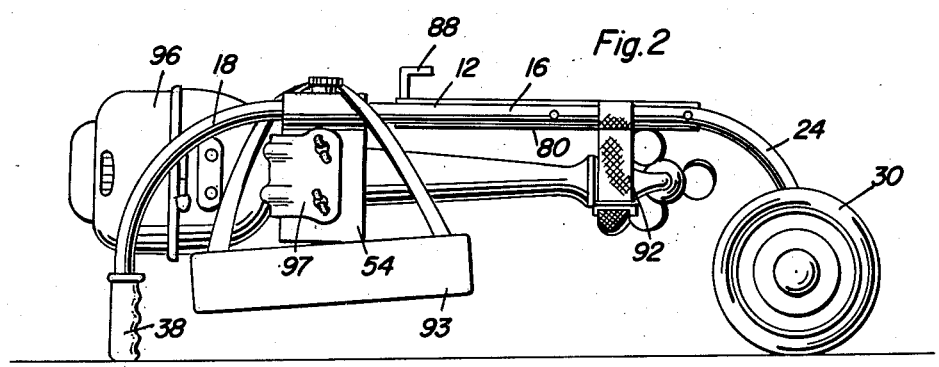
FIGURE 2 is a side view of the device showing it in the outboard motor carrying position, for instance as would be the case if the outboard motor is being transported in a motor vehicle.
Figure 6:
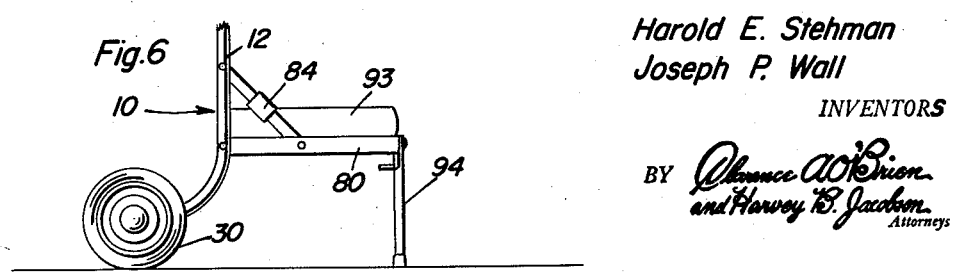
FIGURE 6 is a small diagrammatic view showing the device in side elevation as it would appear when an auxiliary leg is used in place of the seat clamps shown in use in FIGURE 3.

Comparison of FIGURES 1, 3 and 4 shows that the sections 18 and 22 may be adjusted to at least three positions. When in the clamps 48 and 50 in the positions shown in FIGURE 3, the straight parts 34 and 36 function as armrests. When in the position shown in FIGURE 1, sections 18 and 22 serve as handles and when positioned as shown in FIGURE 2 the sections 18 and 22 function as legs. Finally, when in the position shown in FIGURE 4, sections 18 and 22 are simply at an unobtrusive rest or folded position.

A seat frame 80 is pivotally connected by means of pivots 81 to the sections 16 and 20 of sides 12 and 14 and either at or closely adjacent to the curved lower parts 24 and 26 thereof. The seat frame is made light in weight by having metal side and end frame members together with reinforcing straps 82 extending thereacross and secured to opposite sides. Foldable links 84 and 86 are pivotally connected by means of pivot pins to the sides of frame 80 and to sections 16 and 20 thereby holding the frame 80 in an extended position with reference to sides 12 and 14 or enabling the frame to be folded to a position approximately coplanar with sides 12 and 14. A pair of hooks 88 and 89 are attached to one side of frame 80 and these are adapted to engage the edge of the conventional seat 90 in a boat. Seat 90 serves as a partial support for seat frame 80 with a substantial part of the frame 80 resting on the top surface of the seat 90. The wheels serve also as a partial support for the seat frame. Flexible strap 92 extending across the sections 16 and 20 forms a partial backrest, and the backrest board 52 also forms a partial backrest. Cushion 93 is a life preserver, and it is adapted to be set in the seat frame 80 with links 84 and 86 providing partial lateral stability for the seat cushion-life preserver 93.

In the event that the boot construction will not admit of the position shown in FIGURE 3, auxiliary leg 94 may be used. When it is not in actual use the auxiliary leg is supported beneath the seat frame 80 and held in place by screw and nut assembly 95 passing through an opening in one of the transverse braces 82 and through an opening in leg 94 intermediate the upper and lower ends thereof.

Although the flexible strap 92 may serve as a partial backrest (FIGURE 3) the principal purpose of the flexible strap 92 is to support the propeller end of the outboard motor assembly 96. The conventional outboard motor clamp 97 is engaged with the motor support 54 thereby firmly and rigidly connecting the outboard motor to the device 10 so that it may be moved about (FIGURE 1), temporarily supported in an upright position (FIGURE 1 in dotted lines) or stored or carried by means of a conveyance (FIGURE 2). When device 10 is used as shown in FIGURE 1, the seat 93 provides an excellent area on which to maintain a tackle box 98, a gasoline can 99 or any other equipment which the owner wishes. Further, since the seat frame 80 is adjustable between operative and folded positions, the folded position is recommended when use of device 10 is as shown in FIGURE 2, in which case the seat-like preserver 93 may simply be strung over any part of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination outboard motor guard, dolly and boat seat comprising a pair of elongated parallel sides each including first and second generally L-shaped sections, said sides being similar, clamp means including a back rest secured between one pair of corresponding sections of said sides, disposed on corresponding ends thereof and releasably coupling corresponding ends of the other pair of sections to said one pair of sections for alternate positioning in a first supporting position with the free ends of said other sections extending rearwardly of said sides and said adjacent ends of said first and second sections substantially paralleling each other and extending in opposite directions and a second arm rest position with the free ends of the other pair of sections extending forwardly of said sides and said adjacent ends substantially paralleling each other and extending in the same direction, supporting wheels carried by the free ends of said one pair of corresponding sections and journaled for rotation about parallel axes, a seat frame adapted to support a life preserver cushion, means movably mounting said seat frame between said sides and for movement between a first position projecting laterally outwardly and forwardly of the mid-portion of said sides adjacent the free ends of said one pair of sections and generally paralleling the free ends of said other pair of sections when in their second positions and a second position generally paralleling said adjacent ends and disposed between said sides.

2. The combination of claim 1 wherein said seat frame includes an auxiliary leg for selectively partially supporting the outer end of said seat frame when disposed in its first position.

3. The combination of claim 1 including means connected with said backrest and extending rearwardly of said seat sides and adapted to support an outboard motor lengthwise of said sides and in a position between said sides in which position the outboard motor may be transported.

4. The combination of claim 1 including hook means carried by the outer end of said seat frame adapted to embracingly engage the forward edge of a boat seat on which said seat frame is disposed when in its first position.

5. The combination of claim 1 wherein said clamp means includes means for removably coupling said one pair of sections to said backrest.

6. The combination of claim 5 wherein said clamp means includes means journaling said corresponding ends of said other pair of sections to said backrest for rotation about axes extending longitudinally of said last mentioned corresponding ends.

7. The combination of claim 5 wherein said clamp means includes means journaling said corresponding ends of said other pair of sections to said backrest for rotation about axes extending longitudinally of said last mentioned corresponding ends and includes means for retaining said last mentioned corresponding ends in selected rotated positions.

References Cited in the file of this patent

UNITED STATES PATENTS

| | | |
|---|---|---|
| D. 185,755 | Klages | July 28, 1959 |
| 2,450,304 | Shiflet | Sept. 28, 1948 |
| 2,468,390 | Binz | Apr. 26, 1949 |
| 2,484,227 | Houk | Oct. 11, 1949 |
| 2,582,435 | Howard | Jan. 15, 1952 |
| 2,721,085 | Powell | Oct. 18, 1955 |
| 2,843,393 | Dahlander | July 15, 1958 |
| 2,901,261 | Olvey | Aug. 25, 1959 |

FOREIGN PATENTS

| | | |
|---|---|---|
| 380,411 | Great Britain | Sept. 15, 1932 |